ADDITIVE COLOR TELEVISION

Filed Oct. 28, 1949 2 Sheets-Sheet 1

INVENTOR
Alfred N. Goldsmith
BY
Paul J. Mitchell
ATTORNEY

Sept. 22, 1953 | A. N. GOLDSMITH | 2,653,183

ADDITIVE COLOR TELEVISION

Filed Oct. 28, 1949 | 2 Sheets-Sheet 2

INVENTOR
Alfred N. Goldsmith
BY
[signature]
ATTORNEY

Patented Sept. 22, 1953

2,653,183

UNITED STATES PATENT OFFICE 2,653,183

ADDITIVE COLOR TELEVISION

Alfred N. Goldsmith, New York, N. Y., assignor to Radio Corporation of America, a corporation of Delaware Application October 28, 1949, Serial No. 123,999

8 Claims. (Cl. 178—5.2)

Figures 1, 2:
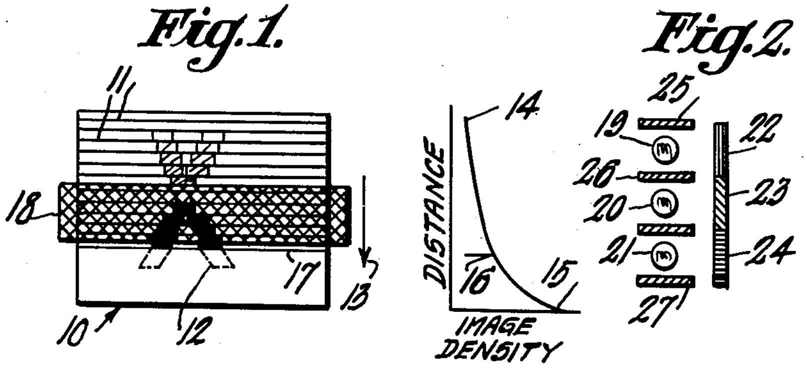

This invention relates to color television and has for its principal object the provision of an improved color television system and method of operation whereby a colored image is formed at a light valve which (1) is initially transparent, (2) is exposed successively to light beams of different colors and (3) is scanned by a cathode ray, or an electron beam, to vary its capacity in accordance with the shade of the transmitted subject matter.

The light valve utilized in the color television system of the present invention is susceptible of use in color television systems of either the additive or subtractive type, and in systems of either the sequential or the simultaneous type. It is described herein as applied to a system of the additive type. In my copending application Serial No. 108,822 filed August 5, 1949 it is described as applied to the subtractive type.

The general characteristics of these different color television systems are well known. In the subtractive type of system, white light is passed successively through two or more component or primary color valves which have color absorptive characteristics such that the light transmitted through the final valve retains the spectral band required to present the desired colors to the eye of the observer. In the additive type of system, the light may be applied to the valve through a filter, a color disc, or its equivalent, which transmits simultaneously or successively, light colored in accordance with the primary colors of the subject matter. In a sequential system, the primary-color images are rapidly and successively presented; in a simultaneous system, the primary-color images forming the color picture appear simultaneously.

The light valve itself is hereinafter sometimes called a kineslide. A kineslide is an element upon which a light absorbing image, in lights and shades, is formed by electronic scanning action. The image thus formed is non-luminous in contradistinction to the image formed, for example, on a fluorescent target screen. Thus in a darkened room, the image on a kineslide would be invisible. The image, however, consists of different densities of black or gray substance and can be made visible by causing light to pass through it. The resulting image is observed visually or is projected through a suitable system upon a viewing screen.

Thus the term kineslide is intended to convey the thought that the image formed resembles that of an ordinary lantern slide but is in motion. A kineslide produces a rapid sequence of images.

If the frequency of the sequence is above the fusion frequency for viewing, the kineslide is capable of producing a smoothly moving picture by direct viewing or screen projection.

Different types of kineslides are known. Some of these are described in detail in my aforesaid application. An initially-transparent type of kineslide, suitable for use in the case of the present invention, utilizes a thin crystal of an alkaline salt such as potassium bromide for example. Such an halide crystal is used as a target for a scanning electron beam which forms thereon an image in lights and shades of light-absorbing material. The action being reversible, this image fades out and can be replaced by another image in the next scanning.

Another type of kineslide uses electronically scanned flake suspensions, normally opaque but brought toward transparency by the electrostatic forces caused by electron impact on the suspension container wall. A more detailed description of this type of kineslide or light valve is to be found in the Proceedings of the I. R. E. for May, 1943, pages 195–208. A cathode ray tube suitable for producing the cathode beam by which the kineslide is scanned is described at pages 197 and 208–214 of the same issue of the proceedings.

The invention will be better understood from the following description considered in connection with the accompanying drawings and its scope is indicated by the appended claims.

Referring to the drawings:

Figure 1 is an explanatory showing relating to the operational characteristics of the kineslide.

Figure 3:
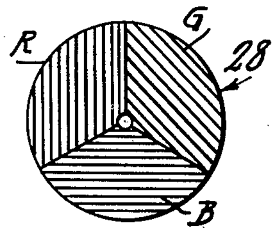
Figure 4:
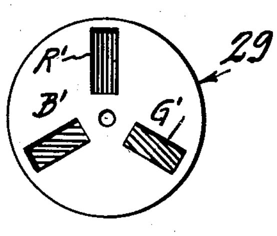
Figure 6:
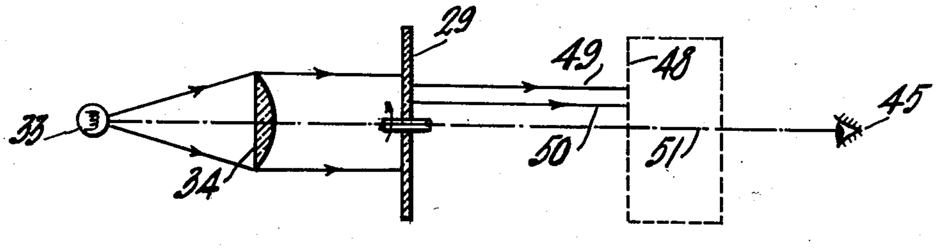
Figure 7:
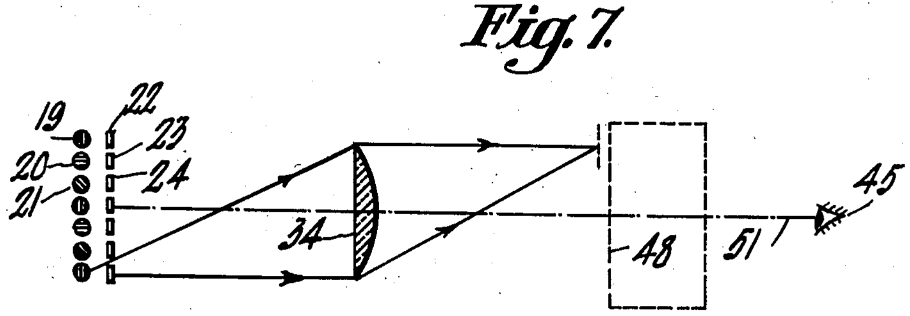
Figure 5:
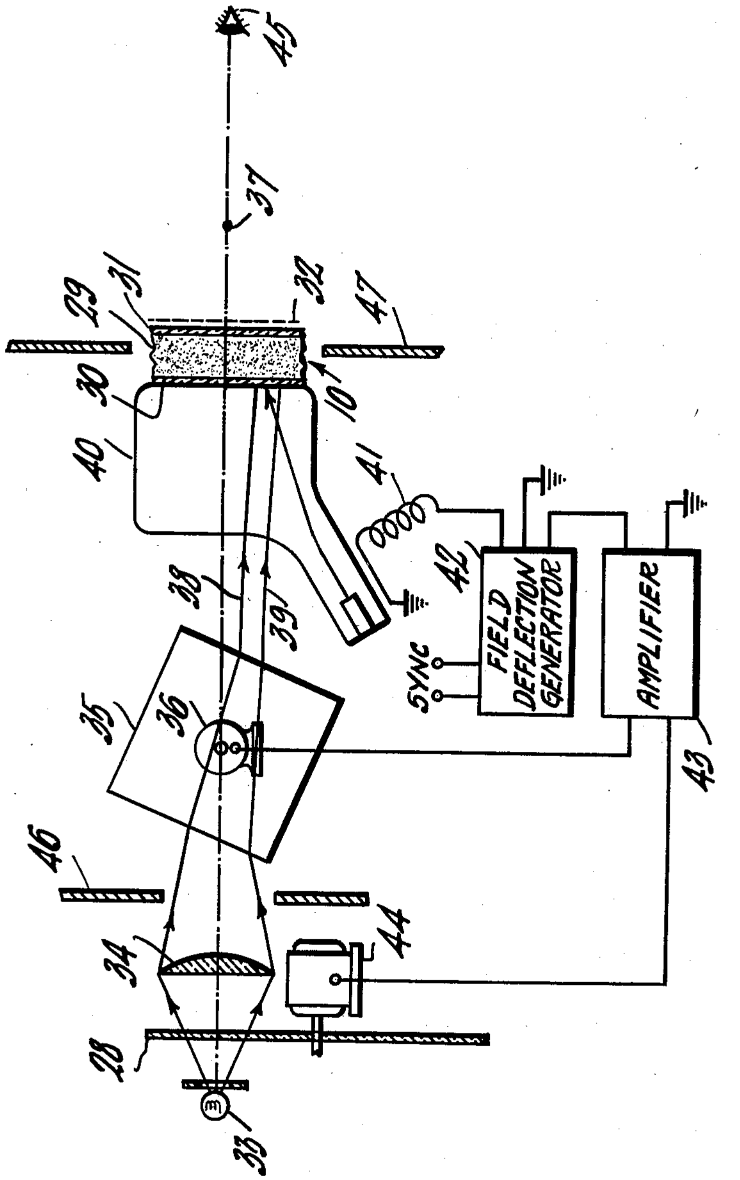

Figures 2, 3 and 4 illustrate different types of means for illuminating the kineslide by light which is successively changed from one component or primay color to another, Figure 5 illustrates a first form of the invention which includes the kineslide illuminating means of Figure 3, Figure 6 illustrates a second form of the invention including the illuminating means of Figure 4, and Figure 7 illustrates a third form of the invention including the illuminating means of Figure 2.

Figure 1 shows a kineslide 10 which may be of any suitable type such that it is initially transparent (or opaque) and is self-restoring to a transparent (or opaque) condition within a period not greatly exceeding the scanning and formation of a single image therein—a condition obviously necessary if rapid motion is to be shown without "smearing" by the image formed on the kineslide. For illustrative purposes, an initially transparent kinescope is considered in the following.

Typical scanning lines are indicated by the horizontal lines 11. The object scanned is considered to be in the form of an X which is indicated by the reference numeral 12. The object 12 is black against a white background. The direction of scanning is from top to bottom as indicated by the arrow 13.

The decay of the image 12 is in accordance with the curve 14—15 at the right of Figure 1. The curve 14—15 is obtained by plotting image density as abscissas and distance from the instantaneous scanning line 17 as ordinates. Thus at the point 16 on the curve 14—15, the image density has decreased to approximately one half its maximum value, the point 16 being displaced from the instantaneous scanning line 17 by the ordinate of the point 16.

Accordingly at the time the scanning line 17 is traversed, the image 12 will appear somewhat as shown in Figure 1. Thus it is black at the instantaneous scanning line 17, quite light at its upper part and transparent at its lower part which has not been scanned.

If the entire surface of the kineslide were to be brightly illuminated and projected on a viewing screen, the image would be considerably degraded, would appear "washed out," and would have a correspondingly low gamma or gradation range. As a result, any system which projects an initially-transparent kineslide as a whole is inoperative to produce satisfactorily an image in motion. The present invention overcomes this defect and enables the projection of initially-transparent (or initially-opaque) kineslides with a minimum of degradation or reduction of gamma.

The method by which this result is accomplished involves (1) forming on the kineslide a rectangle of illumination 18 which is a fraction of the height of the kineslide and (2) moving this rectangle of illumination synchronously with the scanning beam with its edge nearest the scanning spot slightly retarded relative to the corresponding instantaneous scanning line. Thus the rectangle 18 has its lower edge just above the instantaneous scanning line 17, has a height which is less than that of the kineslide 10, has a width slightly greater than that of the kineslide, and is moved to keep it in the same relative position to the instantaneous scanning line 17.

The greater the height of the rectangle 18, the brighter the high-lights of the viewed or projected image, but the greater the loss of contrast in the image. Conversely, the less the height of the rectangle 18, the greater the contrast or gamma of the image but the less its brightness. In the case of an initially-opaque kineslide, similar analysis shows that the greater the height of the rectangle 18, the darker the high-lights of the viewed or projected image, and the greater the loss of contrast in the image.

In applying this method to color television, it is possible to utilize any form of illumination meeting the requirements outlined above.

A first form of illumination illustrated by Figure 2 includes three light sources 19, 20 and 21 which preferably have selective radiation concentrated mainly around the three primary colors. These sources may be gas-filled lamps from which light passes through filters 22, 23, and 24. If the lamps were white in color, the corresponding filters would be normal additive tricolor filters. If the lamps radiate selectively as indicated above, the filters may be of the minimal-absorption type. Baffles 25, 26, and 27 serve to isolate the lamps from one another so that only light from each particular lamp is transmitted through the corresponding component-color filter. As is well known, such lamps can be flashed at times controlled by thyratrons which are controlled or made conductive from the field frequency generator. Such methods of control are so well known to those skilled in the art that a detailed description of them would be superfluous. This form of illumination is also discussed at greater length in connection with Figure 7.

A second form of illumination is the conventional color disc 28 which is shown in Figure 3 as having red, green, and blue sectors bearing the reference letters R, G, and B. As indicated more particularly in connection with the modification of the invention illustrated by Figure 5, the disc is rotated between a source of white light and the kineslide.

A third form of illumination is shown in Figure 4. It includes a modified color disc 29 having three rectangular apertures R', B', and G' which are located 120 degrees apart and are covered by red, green, and blue filters respectively. This form of illumination will be further discussed in connection with Figure 6.

Figure 5 shows a form of the invention wherein optical means are provided for producing and moving the illuminated rectangle 17 of Figure 1 transversely of the kineslide 10 which is shown in Figure 5 as including a flake suspension 29 interposed between a mica tube face 30 and a mica outer wall 31 bearing a semitransparent electrode 32.

This kineslide is illuminated from a powerful source of white light 33, preferably of rectangular shape, through the color disc 28 of Figure 3, a convergent lens 34 and a prism 35 which is rotated by suitable means such as a motor 36. In the absence of the prism 35, the lens 34 would image the light source at the location 37. One effect of the prism 35 is to move the focal point from the location 37 to a location closer to the kineslide, thus providing a rectangularly shaped area of illumination which has its height defined by the light rays 38 and 39 and is moved from the top to the bottom of the kineslide as the prism 35 is rotated.

Associated with the kineslide is a cathode ray tube 40 which includes an electron gun for producing a beam of electrons. Means, shown schematically as a coil 41, are provided for causing the beam to scan the juxtaposed surface of the kineslide in a conventional manner. To this end, the coil 41 is energized from a field deflection generator 42 which is controlled by the incoming synchronizing signals.

Also energized from the generator 42 through an amplifier 43 are the motor 36 which rotates the prism 35 and a motor 44 which rotates the tricolor filter disc 28.

The relation between the rotational speeds of the motors 36 and 44 and the speed at which the kineslide is scanned is such that the filter disc 28 is rotated at one-third the field frequency and the prism 35 is rotated at one-fourth the field frequency. Under these conditions, the three color sectors of the disc 28 are each effective during one field and the rectangularly shaped light beam is swept across the image produced in the suspension 29 once for each field. The image may be viewed directly as indicated by the eye 45 or may be projected on a viewing screen.

In order to exclude unwanted stray light, an enclosure indicated by baffles 46—47 may be provided. It will be understood that the speeds of the color disc 23 and the prism 35 can be suitably related to the scanning speed by gearing, by selecting motors having the required number of poles, or the like. Exact phasing between the speeds of the motors and the speed of scanning can be effected either by adjustable coupling on the motor shafts or by the use of delay networks in the leads between the amplifier 43 and the motors.

The form of the invention illustrated by Figure 6 utilizes the filter disc 29 of Figure 4 for the purpose of producing the desired motion of the component-color illuminated areas across the kineslide. In this modification, light from the source 33 is projected through the lens 34 and the filtered apertures of the disc 29 to the kineslide which is indicated by a broken line 48. With suitable dimensions of the optical system and disc, an illuminated area 49—50 is moved downwardly across the kineslide 48. Obviously, there will be some degree of skewing (angularity of placement) of the illuminated area as the result of rotation of the disc 29. However, if the radius of the disc is sufficiently great and the passage of the illuminated area across the kineslide occurs during a relatively small angle of the rotation of the disc, the skewing is not objectionable. It is to be understood that the rotational axis of the disc 29 is so located with respect to the optical axis 51 that its filter openings are centrally intercepted by the optical axis as they sweep therethrough.

The form of the invention illustrated by Figure 7 utilizes a multiplicity of suitably arranged lamps similar to those of Figure 2 for producing movement of the component-color illuminated areas across the kineslide 48. These lamps are arranged in linear relationship and include similar groups of differently colored lamps. Thus the first group at the top of the series consists of the differently colored lamps 19, 20, and 21 from which light is successively projected through a corresponding filter 22, 23, or 24 and the lens 34 to the kineslide 48. All the other groups of lamps are similar to the group 19—20—21.

The filters 22—23—24 and the other similar groups of filters are minimal color filters which are provided to convert light from the selectively-radiating lamps into the desired component-color quality.

In order to move the illuminated area downwardly across the kineslide 48, the similarly colored lamps are energized successively beginning with a lamp in the group at the bottom of the series. Thus the red lamps are energized one after another, then the green lamps are energized successively and next the blue lamps are similarly energized. This cycle of operation is repeated over and over again and may be synchronized with the scanning speed through connection to the field generator and suitable delay circuits as indicated in connection with Figure 5.

In connection with Figures 6 and 7, it should be noted that the tube 40 and kineslide 29—30—31 are indicated by the broken line 48, and that the filter disc 27 of Figure 6 is rotated by a motor (not shown) which is energized in the same manner as the motor 44 of Figure 5.

What the invention provides is an improved color television system wherein a decrescent image formed on an initially-transparent light valve of the flake suspension type by scanning it with an electron beam, is scanned by differently colored light beams which (1) are restricted to the most opaque area of the image and (2) are retarded slightly with respect to the movement of the electron beam transversely of the image. Alternatively, a decrescent image formed on an initially-opaque light valve of the halide-crystal type, by scanning it with an electron beam, is scanned by differently colored light beams which (1) are restricted to the most transparent area of the kineslide and (2) are retarded slightly in relation to the passage of the electron beam across the image.

What is claimed is:

1. A color television system including means for successively forming differently colored light beams, means for forming an electron beam, an element which is initially transparent and is operable in response to its scanning by said electron beam to obstruct said light beams in the form of a decrescent image, means for restricting said light beams to a fractional part of the area of said element, means for moving said electron beam to scan said element, and means for moving said light beams across said element slightly in the rear of said electron beam.

2. A color television system including means for successively forming differently colored light beams, means for forming an electron beam, an element which is initially transparent and is operable in response to its scanning by said electron beam to obstruct said light beams in the form of a decrescent image, means for restricting said light beams to a fractional part of the area of said element, means for moving said electron beam to scan said element, and means including a rotatable prism for moving said light beams across said element slightly in the rear of said electron beam.

3. A color television system including means for successively forming differently colored light beams, means for forming an electron beam, an element which is initially transparent and is operable in response to its scanning by said electron beam to obstruct said light beams in the form of a decrescent image, means for restricting said light beams to a fractional part of the area of said element, means for moving said electron beam to scan said element, and means including said differently colored light forming means for moving said light beams across said element slightly in the rear of said electron beam.

4. A color television system including a color disc having a plurality of apertures for successively forming differently colored light beams, means for forming an electron beam, an element which is initially transparent and is operable in response to its scanning by said electron beam to obstruct said light beams in the form of a decrescent image, means for restricting said light beams to a fractional part of the area of said element, means for moving said electron beam to scan said element, and means including said color disc for moving said light beams across said element slightly in the rear of said electron beam.

5. A color television system including groups of differently colored lamps arranged in linear relation for successively forming differently colored light beams, means for forming an electron beam, an element which is initially transparent and is operable in response to its scanning by said electron beam to obstruct said light beams in the form of a decrescent image, means for restricting said light beams to a fractional part of the area of said element, means for moving said electron beam to scan said element, and means including said differently colored lamps for moving said light beams across said element slightly in the rear of said electron beam.

6. A light valve comprising the combination of means for forming a light beam, means for forming an electron beam, an element which is initially transparent and is operable in response to its scanning by said electron beam to obstruct said light beam in the form of a decrescent image, means for moving said electron beam to scan said element, means for restricting said light beam to a fractional part of the area of said element, and means for moving said light beam across said element slightly in the rear of the movement of said electron beam, whereby said light beam is restricted to that area of said element including said decrescent image.

7. A light valve comprising the combination of means for forming a light beam, means for forming an electron beam, an element adapted to transmit said light beam in the form of a decrescent image in response to its scanning by said electron beam, means for moving said electron beam to scan said element, means for restricting said light beam to a fractional part of the area of said element, and means for moving said light beam across said element slightly in the rear of said electron beam, whereby said light beam is restricted to that area of said element including said decrescent image.

8. A color television system including means for successively forming differently colored light beams, means for forming an electron beam, an element adapted to transmit said light beams in the form of a decrescent image in response to its scanning by said electron beam, means for restricting said light beams to a fractional part of the area of said element, means for moving said electron beam to scan said element, and means for moving said light beams across said element slightly in the rear of said electron beam.

ALFRED N. GOLDSMITH.

References Cited in the file of this patent

UNITED STATES PATENTS

| Number | Name | Date |
|---|---|---|
| 2,101,940 | Hansen | Dec. 14, 1937 |
| 2,330,172 | Rosenthal | Sept. 21, 1943 |
| 2,415,226 | Sxiklai | Feb. 4, 1947 |